United States Patent [19]

Stasik et al.

[11] Patent Number: 5,577,978
[45] Date of Patent: Nov. 26, 1996

[54] START RATIO SELECTION SYSTEM AND METHOD

[75] Inventors: Anthony Stasik, Coppull; John E. Stainton, Chorley, both of England

[73] Assignee: Eaton Corporation, Cleveland, Ohio

[21] Appl. No.: 506,988

[22] Filed: Jul. 28, 1995

[30] Foreign Application Priority Data

Aug. 5, 1994 [GB] United Kingdom .................. 9415861

[51] Int. Cl.$^6$ ................................................ B60K 41/24
[52] U.S. Cl. .............................................. 477/78; 477/80
[58] Field of Search .............................. 74/335; 477/78, 477/77, 79, 80, 81

[56] References Cited

U.S. PATENT DOCUMENTS

| | | | |
|---|---|---|---|
| 4,614,258 | 9/1986 | Fukunaga | 477/80 X |
| 4,648,290 | 3/1987 | Dunkley et al. | 74/866 |
| 4,735,109 | 4/1988 | Richards et al. | 74/745 |
| 4,754,665 | 7/1988 | Vandervoort | 74/746 |
| 4,800,360 | 1/1989 | Dunkley et al. | 340/52 |
| 4,930,078 | 5/1990 | Dunkley et al. | 364/424.1 |
| 4,930,081 | 5/1990 | Dunkley et al. | 364/424.1 |
| 5,095,774 | 3/1992 | Takahashi et al. | 477/78 |
| 5,408,895 | 4/1995 | Chan et al. | 74/335 |
| 5,415,604 | 5/1995 | Bates et al. | 477/78 |
| 5,429,559 | 7/1995 | Steeby | 477/80 |
| 5,444,623 | 8/1995 | Genise | 74/335 X |

*Primary Examiner*—Charles A. Marmor
*Assistant Examiner*—Peter Kwon
*Attorney, Agent, or Firm*—Howard D. Gordon

[57] ABSTRACT

A control system and method for a vehicular semi-automatic mechanical transmission system (10) is provided for allowing operator request, immediately after bringing a vehicle to rest, for both a direct shift into a preselected start ratio and a direct shift into neutral, under certain predefined conditions, by a single movement of the shift selection lever (1).

6 Claims, 6 Drawing Sheets

START RATIO SELECTION SYSTEM AND METHOD

BACKGROUND OF THE INVENTION

Related Applications

This application claims priority from GB 9415861.5, filed Aug. 5, 1994.

This application is related to U.S. Ser. No. 08/104,698, filed Aug. 11, 1993 (EP 584,968A), entitled START RATIO SELECTION CONTROL SYSTEM AND METHOD, and assigned to the assignee, EATON CORPORATION, of this application.

This application is related to U.S. Ser. No. 07/935,937, filed Aug. 27, 1992 (EP 585,020A), entitled START GEAR RATIO CONTROL SYSTEM AND METHOD, and assigned to the assignee, EATON CORPORATION, of this application.

Field of the Invention

The present invention relates to a control system and method for the semi-automatic control of a mechanical change-gear transmission including means for automatically executing automatically determined and displayed allowable driver-selected transmission ratio shifts, including automatic control of the vehicle master clutch. In one embodiment, a clutch pedal is provided and the master clutch operation is automated in all but start-from-stop situations, and in another embodiment, the master clutch is fully automated and no clutch pedal is provided. In particular, the present invention relates to a system and method for controlling a semi-automatic mechanical transmission wherein, immediately after a vehicle comes to rest, a single downshift request made at a time when the vehicle is at rest and the master clutch is disengaged, is interpreted as a request for a direct shift into transmission neutral and/or a single upshift request made at a time when the vehicle is at rest and the master clutch is disengaged, is interpreted as a request for a direct shift into a preselected start ratio. Subsequent shift requests made while the vehicle is at rest are interpreted as follows: from neutral, a single upshift request is interpreted as a request for a direct shift into the preselected start ratio and, from a start ratio, a request for a number of upshifts or downshifts is interpreted as a request for a direct upshift or downshift, respectively, by that number of ratios.

Description of the Prior Art

Fully automatic transmission systems, both for heavy-duty vehicles such as heavy-duty trucks and/or coaches and for automobiles, which sense throttle openings or positions, vehicle speeds, engine speeds and the like and automatically shift the vehicle transmission in accordance therewith, are well known in the prior art. Examples of such transmissions may be seen by reference to U.S. Pat. Nos. 3,961,546; 4,081,065; 4,361,060; 5,050,079 and 5,109,729, the disclosures of which are incorporated herein by reference.

Semi-automatic mechanical transmission systems are known wherein automatic changing between a plurality of gear ratios is provided while normally permitting the driver to choose when to make a particular gear ratio change and whether to select the immediately consecutive ratio up or down or to skip one or more ratios. The semi-automatic control systems prohibit engagement of a driver-selected higher ratio (i.e., an upshift) that would cause the engine speed to decrease below the idle speed (i.e., would cause stalling and/or overstressing of the engine at low speeds) and of a lower ratio (i.e., a downshift) if such a change would cause overspeeding of the engine. Examples of such semi-automatic transmission controls may be seen by reference to U.S. Pat. Nos. 4,648,290; 4,800,360; 4,930,081 and 4,930,078, the disclosures of which are incorporated herein by reference.

While the above-described semi-automatic mechanical transmission controls did provide a very desirable semi-automatic control, the control was subject to improvement as, if the driver or operator desired a shift into neutral or into a selected transmission start ratio while the vehicle was at rest, the driver was required to identify the currently engaged ratio, to calculate the number of steps from the currently engaged ratio to neutral or the selected start ratio, and to then move the selector lever that number of times in the upshift or downshift direction. This was particularly a concern in modern mechanical transmissions for heavy-duty vehicles which may have 9, 10, 12, 13, 16 or 18 forward speed ratios and wherein any one of the first seven ratios may be appropriate start ratios under certain conditions. Examples of such multi-speed mechanical transmissions may be seen by reference to U.S. Pat. Nos. 4,735,109 and 4,754,665, the disclosures of which are incorporated herein by reference.

These drawbacks of the prior art semi-automatic mechanical transmission controls have been minimized or eliminated by the provision of a control and control method which, if the vehicle is at rest and the master clutch is manually disengaged, the control unit will interpret and execute a single movement of the control lever in the downshift direction from a relatively high gear ratio as a request for a direct downshift, preferably to neutral, or alternatively to a preselected start ratio, and a single movement of the control lever in the upshift direction from neutral, as a request for an upshift directly into a selected start ratio. Preferably, the preselected start ratio is adaptively determined and is the last actually used start ratio. These improved semi-automated transmission controls may be more fully appreciated by reference to the aforementioned related applications, U.S. Ser. Nos. 07/935,937 (EP 585,020A) and 08/104,698 (EP 584,968A), and the corresponding European patent applications, the disclosures of which are incorporated herein be reference.

The prior art semi-automated mechanical transmission controls were subject to further improvement, as it is desirable to provide a control which will allow rapid selection of both neutral and the preselected ratio, from any ratio, including one of the start ratios, upon stoppage of the vehicle.

SUMMARY OF THE INVENTION

The drawbacks of the prior art vehicular semi-automated mechanical transmission systems are minimized or overcome by the provision of a control system/method, effective immediately upon bringing a vehicle to rest, allowing selection, from any engaged ratio, of both a direct shift to neutral and a direct shift to a preselected start ratio, by a single movement of the shift selector. After the initial selection, reverse may be selected by a separate selector or by a downshift selection from neutral, and the preselected start ratio may be selected by a single upshift selection from neutral. A particular ratio, other than the start ratio, may be selected by appropriate selection of single or skip upshifts or downshifts, as required.

The foregoing is accomplished, in a semi-automated mechanical transmission system of the type described, by defining a set of logic rules or a subroutine for setting a flag whenever vehicle speed exceeds a relatively low value, the flag is canceled if vehicle speed equals about zero and thereafter a shift selection is made. With the flag set, the vehicle at rest and the master clutch disengaged, a single upshift request from a ratio will be interpreted as a request for a direct shift into the preselected start ratio, and a single downshift request from a ratio will be interpreted as a request for a direct shift into neutral. With the flag not set and the vehicle at rest, single upshift and downshift requests from a ratio are interpreted as requests for single upshifts and single downshifts, respectively. With the vehicle at rest and the master clutch disengaged, regardless of the presence or absence of the flag, a single upshift request with the vehicle in neutral is interpreted as a request for a direct shift to the preselected start ratio.

Accordingly, it is an object of the present invention to provide a new and improved control system/method for semi-automatic mechanical transmission having a control for automatically determining allowable up and down shifts from a given gear ratio, preferably for automatically displaying same, for automatically executing such permissible gear ratio changes upon selector lever manual selection thereof by the vehicle operator, and wherein, upon the vehicle coming to rest, the operator can request an automatic shift directly into a selected start ratio and into neutral by a single movement of the selector lever.

This and other objects and advantages of the present invention will become apparent from a reading of the following description of the preferred embodiments taken in connection with the attached drawings.

DESCRIPTION OF THE PREFERRED EMBODIMENT

Figure 1:
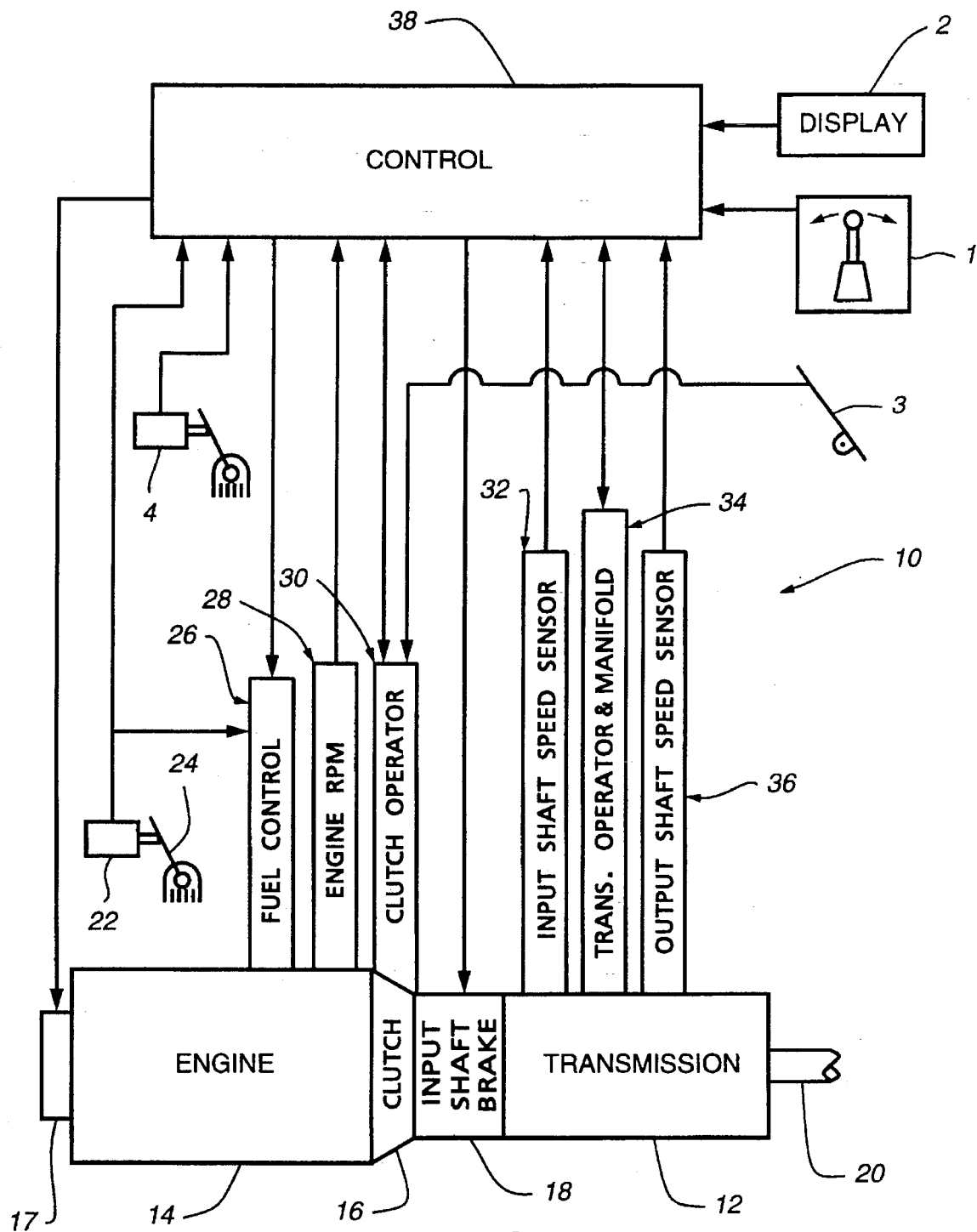
FIG. 1 is a schematic illustration of the semi-automatic mechanical change-gear transmission system of the present invention.

In the present description of the preferred embodiment, certain terminology will be used for descriptive purposes only and is not intended to be limiting. The terms "upward", "downward", "rightward" and "leftward" will refer to directions in the drawings to which reference is made. The terms "inward" and "outward", refer to directions towards and away from, respectively, the geometric center of the device, or portion thereof, being described. The above applies to derivatives of the terms above specifically mentioned, and terms of similar import.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter-type compound transmission" as used herein will designate a compound transmission wherein the auxiliary transmission is used to provide various selectable steps for subdivisions of the gear ratio selected in the main transmission portion. In a splitter-type compound transmission, the main transmission section is typically provided with relatively wide steps which are split or subdivided by the auxiliary section. The term "upshift" as used herein, shall mean the shifting from a lower speed gear ratio into a higher speed gear ratio. The term "downshift" as used herein shall mean the shifting from a higher speed gear ratio to a lower speed gear ratio. The terms "low speed gear", "low gear" and/or "first gear" as used herein shall all designate the gear ratio utilized for lowest forward speed operation in a transmission or transmission section (i.e., that set of gears having the highest ratio of reduction relative to the input shaft of the transmission).

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one and two ratios, respectively, from fourth and fifth speed, respectively, in the downshift direction.

The term "blocked transmission" or "blocked transmission section" shall designate a change-gear constant mesh transmission or transmission section, wherein a selected one of a plurality of axially movable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196 and 4,440,037, the disclosures of all of which are incorporated herein by reference.

The present invention is applicable, in principle, to the semi-automatic control of any type of mechanical change-gear transmission adaptable for providing output signals to and receiving command signals from electronic control devices. However, the semi-automatic control system of the present invention is particularly advantageously applied to a splitter-type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in European Pat. App. No. 82303586.2, published Feb. 9, 1983 (EP-A-0071353) and European Pat. App. No. 83307061.8, published Sep. 5, 1984 (EP-A-0117342) and U.S. Pat. No. 4,735,109. Transmissions of the type illustrated in above-mentioned U.S. Pat. No. 4,754,665 may be advantageously used in connection with the present invention.

The semi-automatic transmission system to which the present invention is particularly advantageously related, is described an illustrated in European Pat. App. No. 85305072.2, published Feb. 5, 1986 (EP-A-0170465) and U.S. Pat. No. 4,648,290.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that transmission output shaft speed is an indication of vehicle ground engine speed and that engine speed is an indication of transmission input shaft speed, and vice versa, especially if clutch 16 is nonslippingly engaged.

The throttle position sensor 24 may be of the type illustrated in U.S. Pat. No. 4,922,425, the disclosure of which is incorporated by reference, which will indicate the presence or absence of the operator's foot on the throttle pedal as well as displacement of the throttle pedal.

Devices, such as throttle position sensor assembly 22, for sensing the operators setting of a throttle pedal 24, or the like, and providing a signal proportional to, or at least indicative of, the monitored setting, and so called "remote fuel control" or "fly by wire" systems utilizing same, are known in the prior art and illustrated in the U.S. Pat. Nos. 4,250,845; 4,305,359; 4,319,658 and 4,461,254, the disclosures of which are incorporated herein by reference.

For control of vehicle SAMT systems 10, such as the systems illustrated in above-mentioned U.S. Pat. No. 4,648, 290; 4,551,802; 4,361,060 and 4,081,065, it is important to provide accurate input signals to central processing unit, or control, 38, indicative of the operator's positioning of the throttle. The setting is usually expressed as a percentage of wide-open or full throttle with the idle position being zero percent (0%) and full or maximum throttle being one hundred percent (100%).

Figure 2:
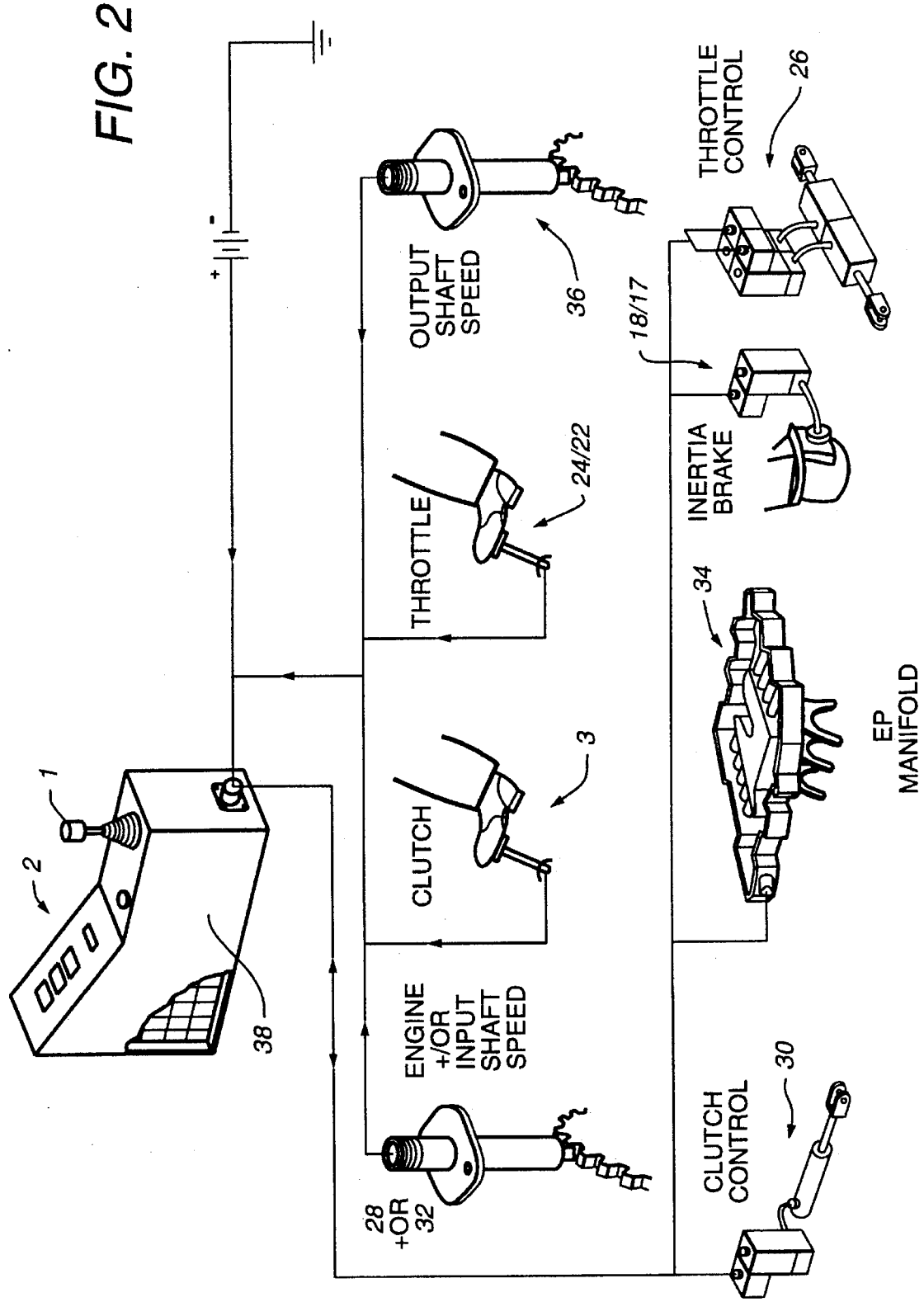
FIG. 2 is a schematic illustration of the control system of the semi-automatic transmission of the present invention.

Control logic circuits, sensors, and actuators for the transmission system 10 as disclosed in FIGS. 1 and 2, may be as disclosed in above-mentioned U.S. Pat. Nos. 4,361, 060; 4,648,290; 4,930,081 and 4,930,078. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation preparatory to a downshift, clutch control via operator 30, and ratio shifting via transmission operator 34. The transmission operator 34 may also be of the "X-Y" type as illustrated in U.S. Pat. Nos. 4,873,881 and 4,899,607, the disclosures of which are incorporated herein by reference.

The central processing unit also sends command output signals to the display 2 to be described in greater detail below. The semi-automatic transmission system 10 may additionally comprises a usual foot operated manual clutch control 3 intended for use only for start from rest and/or low speed creeping maneuvering situations. The control 38 receives signals indicative of manual clutch control 3 position and of actuation of the vehicle brakes 4. The semi-automatic mechanical transmission system 10 also includes sources of electric and/or pneumatic power (not illustrated).

The central processing unit may be of the type illustrated in U.S. Pat. No. 4,595,986 and may incorporate fault detection and tolerance logic of the type illustrated in U.S. Pat. Nos. 4,849,899; 4,899,279 and 4,945,484, the disclosures of all of which are incorporated by reference.

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Figure 3:
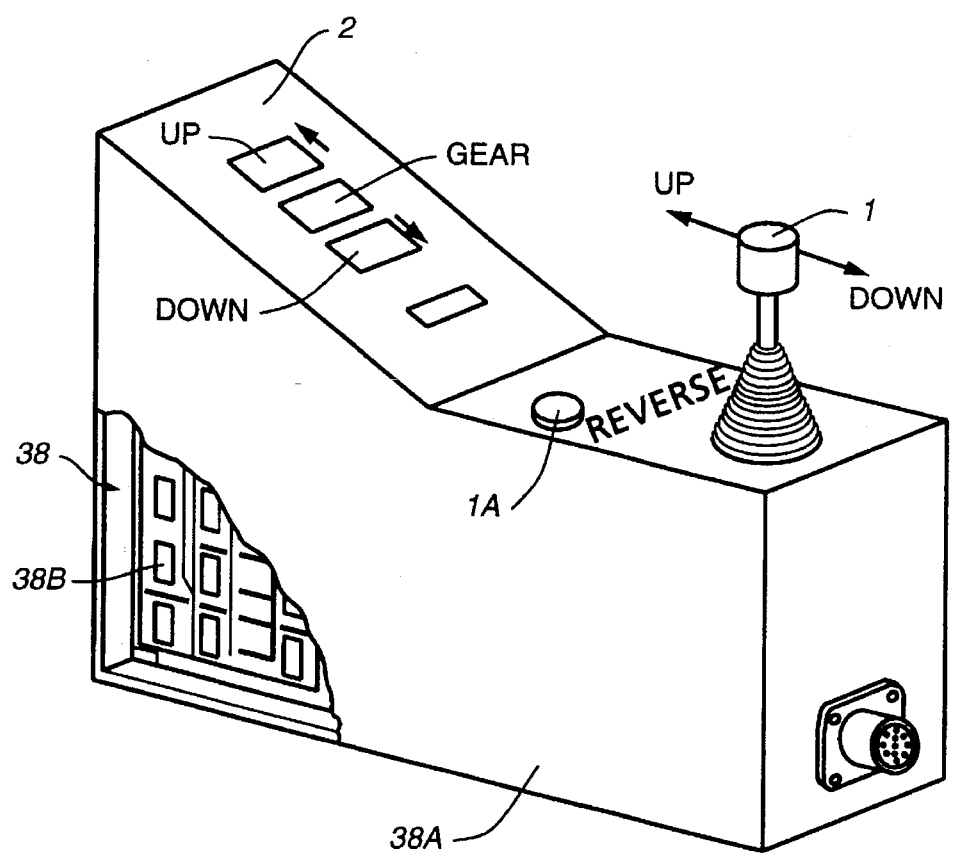
FIG. 3 is a perspective view of the driver's manual shift control and display device.

Preferably, as may be seen by reference to FIG. 3, the central processing unit 38 may be contained in a box or housing 38A, which housing carries the display panel 2 having an upshift indicator display 2', a downshift indicator display 2", and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Figure 3B:
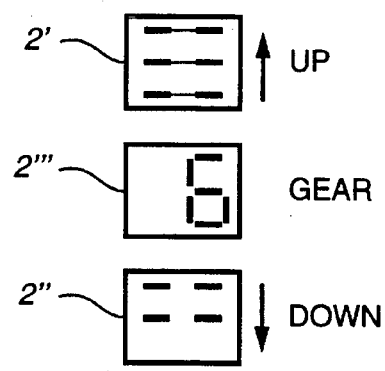
FIG. 3B is an enlarged view of a portion of the display illustrated in FIG. 3.

Referring to FIG. 3B, the display 2 includes upshift indicator section 2', downshift indicator section 2' and currently engaged gear ratio indicator section 2'''. As illustrated, the currently engaged gear ratio display section 2''' is presently displaying a "6" indicating that the vehicle transmission is operating in sixth gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh (7th), eighth (8th) or ninth (9th) speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth or to fourth gear.

Briefly, the permissibility of a possible upshift or downshift is determined by comparing the expected engine speed at the completion of such an upshift or downshift, assuming a substantially constant vehicle speed or a calculated expected vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permissible and as to which upshifts and downshifts are impermissible. Should the driver not heed the warning, the central processing unit 38 will not generate impermissible shift command even though synchronization of the mechanical jaw clutch elements could be obtained by the system.

To shift transmission 12, the driver moves lever 1 forward (for upshifts) and rearward (for downshifts) from the position illustrated in FIGS. 2 and 3. To select a single upshift (i.e., a shift to seventh gear), the operator will move lever 1 forward once and the lever will then return to the neutral or centered position under bias. If in sixth gear, as shown, the operator moves the lever forward three times in quick succession, then allowing its return to rest, he will skip two gears in effect, and achieve a skip shift directly into ninth speed (i.e., seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38.

The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation.

Upshifts and/or downshifts involving both the main and auxiliary section (i.e., compound shifts) are equally simple for the driver to achieve as are those involving only the auxiliary section (i.e., a split shift). In those transmissions provided with multiple reverse gear ratios, the transmission may be downshifted into lower reverse ratios and upshifted into higher reverse ratios by movement of the control lever backward and forward as indicated. Of course, any type of toggle switch or button which may be located on the end of the shift lever may be utilized in place of reverse enable button 1A.

It is understood that a single control lever movable forward and backward in a given direction to select a forward and reverse mode of operation, and then movable in a transverse direction to select upshifts and downshifts either single or multiple, of the type disclosed in U.S. Pat. No. 4,442,730, the disclosure of which is incorporated herein by reference, may be substituted for the control lever 1 illustrated.

To enhance the above-described semi-automatic mechanical transmission system, Applicants have provided the stationary vehicle gear selection control system/method of the present invention. Whenever the vehicle is brought to rest, as sensed by vehicle speed first exceeding a reference (OS>REF) and then being less than or equal to a reference (OS<REF), then the next movement of the selector 1, if a single upshift request, is interpreted as a request for a direct shift into a preselected start ratio and, if a single downshift request, is interpreted as a request for a direct shift into neutral (N). Thereafter, until the next time the vehicle is brought to rest, single and multiple upshift and downshift requests will be treated as requests for single and multiple upshifts and downshifts from an engaged ratio. Preferably, single upshift requests from neutral with the vehicle at rest are always treated as requests for a direct shift into the preselected start ratio.

Figure 4A:
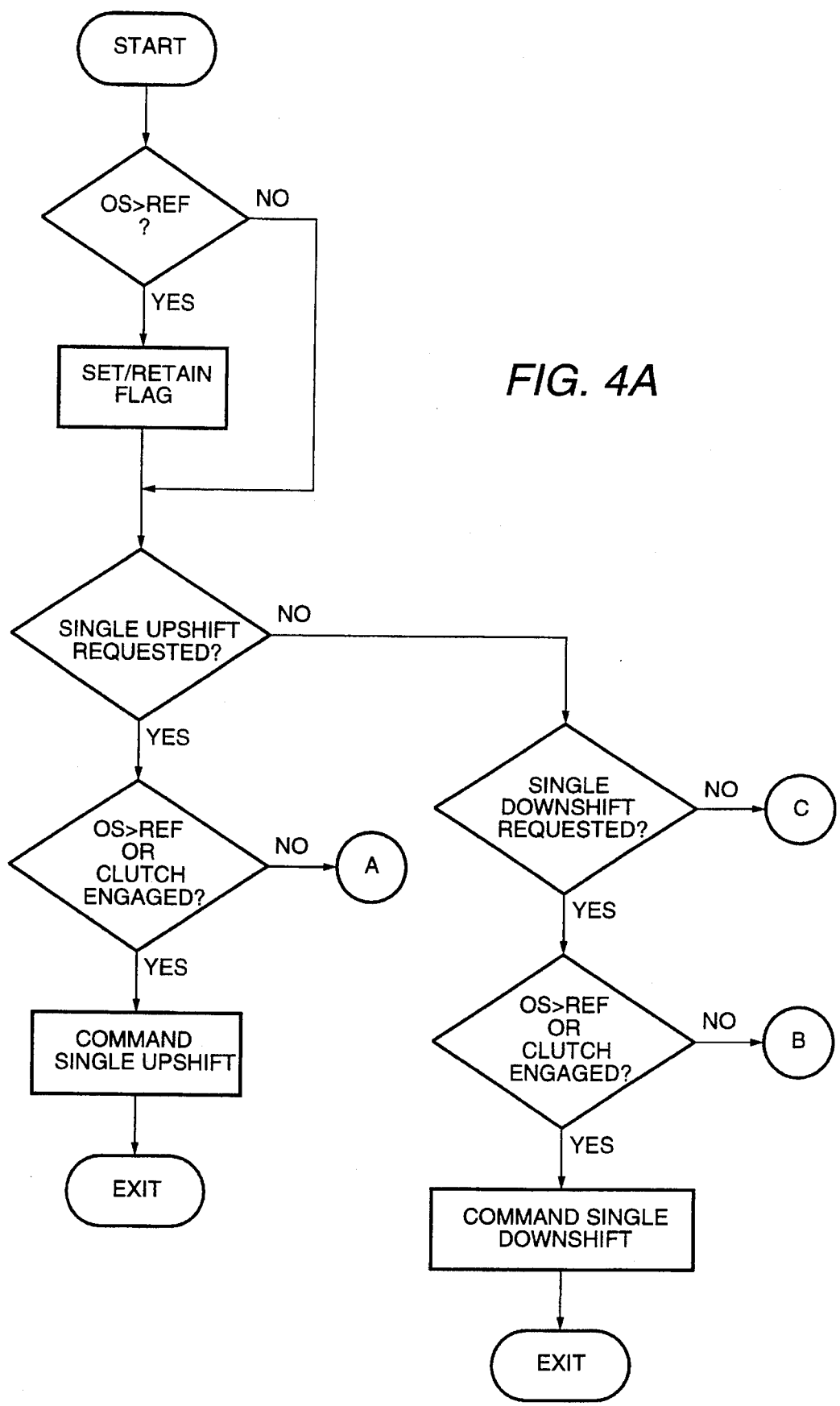
FIG. 4A, 4B and 4C are schematic illustrations, in the form of a flow chart, of the control system/method of the present invention.
Figure 4B:
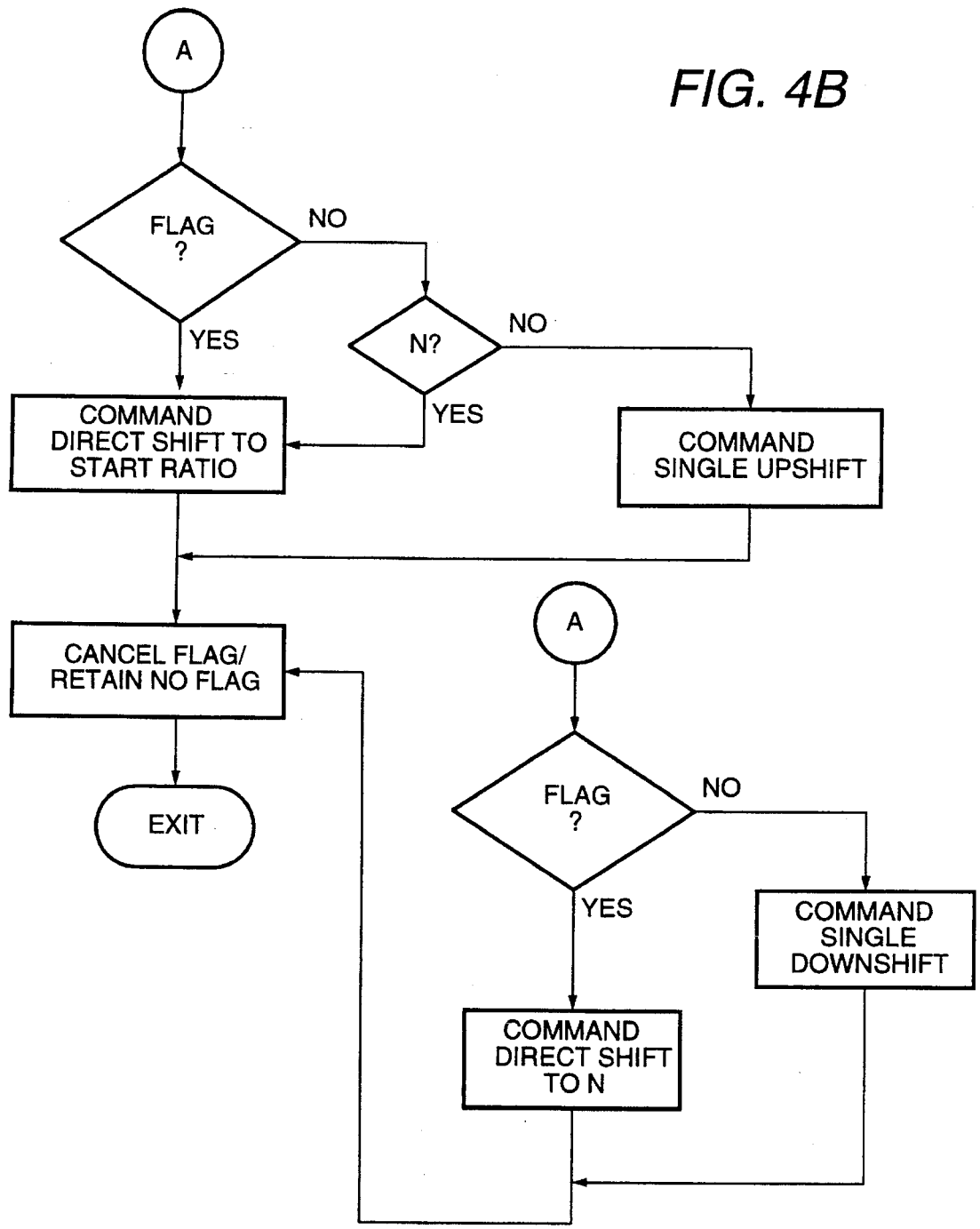
Figure 4C:
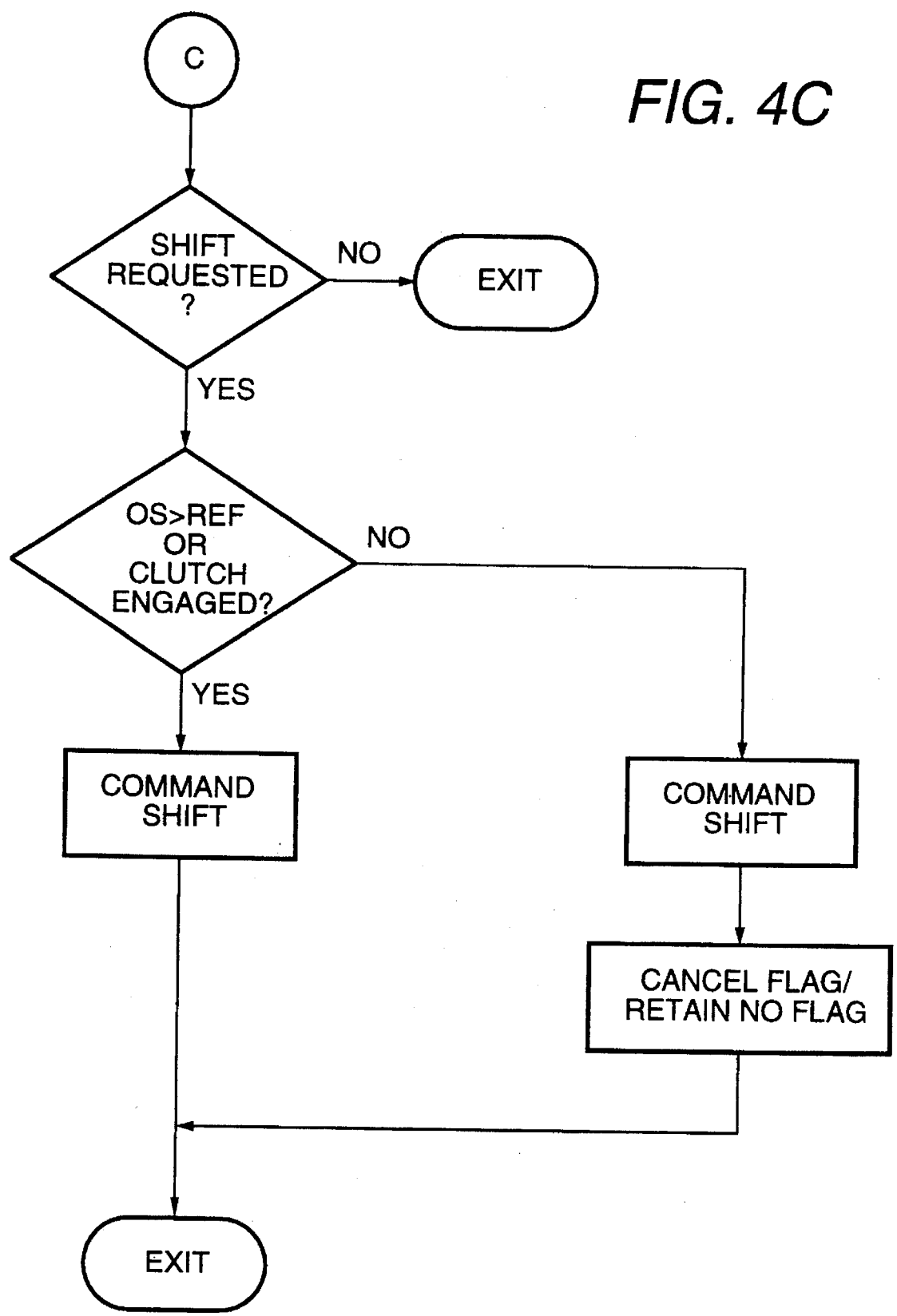

The stationary vehicle gear selection control method of the present invention is schematically illustrated, in flow chart format, in FIGS. 4A, 4B and 4C. By way of example, assume transmission 12 is a 12-forward-speed transmission, ratios 1, 2, 3, 4 and 5 are permissible start ratios, and third is the currently preselected start ratio. If the vehicle is traveling in ninth and is then brought to a stop, a flag will be set. A single upshift request will be interpreted as a request for a direct shift into the preselected start ratio, third speed. The requested shift directly into third will be executed and the control logic will then cause the flag to be canceled. If the vehicle driver actually wants to use fourth for the start ratio (i.e., light vehicle load and/or vehicle traveling downhill), a further single upshift request will be interpreted and executed as a request for a single upshift from third to fourth speed. Preferably, the control will be adaptive as disclosed in aforementioned U.S. Ser. No. 07/935,937 (EP 585,020A, and the new preselected start ratio will become fourth, the last actually utilized start ratio.

Alternatively, the preselected start gear may be preset and fixed, may be selectable by the operator or may be determined by the electronic control unit in view of inputs and predetermined logic rules.

A single movement or pulse of the lever is a movement of the lever from the centered position to a displaced position, in either the upshift or downshift direction, and then the immediate release of the lever allowing the lever to return to the centered position thereof. If the control lever 1 is retained in the displaced position for more than a predetermined period of time (for example, for more than one or two seconds), an alternate control logic may be utilized.

By the above-described procedure, the vehicle operator can, immediately after bringing a vehicle to a stop, with a single movement of the control lever, request a direct shift into a predetermined start gear and into neutral.

Although the preferred embodiment of the present invention has been described with a certain degree of particularity, various changes to form and detail may be made without departing from the spirit and scope of the invention as hereinafter claimed.

We claim:

1. A method of controlling a semi-automatic mechanical change gear transmission system (10) comprising a fuel throttle control (24), a fuel throttle controlled engine (14), a multi-speed change gear mechanical transmission (12) having a lowest grouping of gear ratios (first–fifth) suitable for start from stop operation and having a specific ratio within said lowest grouping of ratios determined to be the predetermined start ratio, a friction master clutch (16) interposed the engine and transmission, a master clutch control (3), a manually operated shift selection lever (1) movable in a first direction from a centered position to select upshifts and in a second direction from said centered position to select downshifts, a central processing unit (38) for receiving input signals indicative of transmission input shaft rotational speed, of vehicle speed and of operation of said shift selection lever and for processing same according to predetermined logic rules to issue command output signals to non-manually controlled operators including a clutch operator (30), a fuel throttle control operator (26), and a transmission operator (34), said processing unit sensing operation of said manual shift selection lever including the direction of movement thereof and the number of displacements of said lever within a predetermined period of time from said centered position, and, in a first mode of operation, determining the transmission gear ratio selected by the operator to be shifted directly into from the currently engaged ratio by assuming each repetition of displacement from the centered position of said shift selection lever in a given direction indicates operator selection of a change of one additional consecutive ratio in said direction; said method comprising:

providing said central processing unit with a signal indicative of disengagement of the friction master clutch; and automatically selecting operation in a second mode of operation if (i) vehicle ground speed is less than a reference value after exceeding said reference value, (ii) the master clutch is disengaged and (iii) said selection lever has not been displaced from the centered position thereof after said vehicle ground speed became less than said reference value;

in said second mode of operation, interpreting a single displacement of said shift selection lever from the centered position thereof in said first direction as a request for a direct shift from an engaged gear ratio into said predetermined start ratio, and interpreting a single displacement of said shift selection lever from the centered position thereof in said second direction as a request for a direct shift from an engaged gear ratio into neutral.

2. The method of claim 1 further comprising immediately ceasing operation in said second mode of operation upon initiation of one shift.

3. The method of claim 1 wherein operation in both said first and said second modes of operation further comprises operation wherein a single displacement of said shift selection lever from the centered position in the first direction when said transmission is in neutral, vehicle ground speed is less than said reference value and said master clutch is disengaged, is interpreted as an operator selection of an upshift directly from neutral into the predetermined start ratio.

4. A system of controlling a semi-automatic mechanical change gear transmission system (10) comprising a fuel throttle control (24), a fuel throttle controlled engine (14), a multi-speed change gear mechanical transmission (12) having a lowest grouping of gear ratios (first-fifth) suitable for start from stop operation and having a specific ratio within said lowest grouping of ratios determined to be the predetermined start ratio, a friction master clutch (16) interposed the engine and transmission, a master clutch control (3), a manually operated shift selection lever (1) movable in a first direction from a centered position to select upshifts and in a second direction from said centered position to select downshifts, a central processing unit (38) for receiving input signals indicative of transmission input shaft rotational speed, of vehicle speed and of operation of said shift selection lever and for processing same according to predetermined logic rules to issue command output signals to non-manually controlled operators including a clutch operator (30), a fuel throttle control operator (26), and a transmission operator (34), said processing unit sensing operation of said manual shift selection lever including the direction of movement thereof and the number of displacements of said lever within a predetermined period of time from said centered position, and, in a first mode of operation, determining the transmission gear ratio selected by the operator to be shifted directly into from the currently engaged ratio by assuming each repetition of displacement from the centered position of said shift selection lever in a given direction indicates operator selection of a change of one additional consecutive ratio in said direction; said system comprising:

sensing means (26) for providing said central processing unit with a signal indicative of disengagement of the friction master clutch; and means for automatically selecting operation in a second mode of operation if (i) vehicle ground speed is less than a reference value after exceeding said reference value, (ii) the master clutch is disengaged and (iii) said selection lever has not been displaced from the centered position thereof after said vehicle ground speed became less than said reference value;

said central processing unit, in said second mode of operation, including logic rules for interpreting a single displacement of said shift selection lever from the centered position thereof in said first direction as a request for a direct shift from an engaged gear ratio into said predetermined start ratio, and interpreting a single displacement of said shift selection lever from the centered position thereof in said second direction as a request for a direct shift from an engaged gear ratio into neutral.

5. The system of claim 4 further comprising means for immediately ceasing operation in said second mode of operation upon initiation of one shift.

6. The system of claim 4 wherein said central processing unit further includes logic rules whereby operation in both said first and said second modes of operation further comprises operation wherein a single displacement of said shift selection lever from the centered position in the first direction when said transmission is in neutral, vehicle ground speed is less than said reference value and said master clutch is disengaged, is interpreted as an operator selection of an upshift directly from neutral into the predetermined start ratio.

* * * * *